United States Patent [19]

Dinwiddie, Jr. et al.

[11] Patent Number: 5,434,592
[45] Date of Patent: Jul. 18, 1995

[54] MULTIMEDIA EXPANSION UNIT

[75] Inventors: John M. Dinwiddie, Jr., West Palm Beach; Bobby J. Freeman; Thomas J. Micallef, both of Boynton Beach; Gustavo A. Suarez, Boca Raton; Bruce J. Wilkie, West Palm Beach, all of Fla.

[73] Assignee: International Business Machines Corporation, Armonk, N.Y.

[21] Appl. No.: 122,819

[22] Filed: Sep. 17, 1993

Related U.S. Application Data

[63] Continuation of Ser. No. 521, Jan. 4, 1993, abandoned, which is a continuation of Ser. No. 650,395, Jan. 31, 1991, abandoned.

[51] Int. Cl.[6] .............................................. G09G 1/14
[52] U.S. Cl. ...................................... 345/133; 345/115
[58] Field of Search ....................... 345/115, 119, 133; 395/153, 154, 162

[56] References Cited

U.S. PATENT DOCUMENTS

| | | | |
|---|---|---|---|
| 4,477,830 | 10/1984 | Lindman et al. | 358/183 |
| 4,599,611 | 7/1986 | Bowker et al. | 340/721 |
| 4,602,286 | 7/1986 | Kellar et al. | 358/22 |
| 4,616,262 | 10/1986 | Toriumi et al. | 358/22 |
| 4,758,892 | 7/1988 | Bloomfield | 358/183 |
| 4,918,526 | 4/1990 | Lewis et al. | 358/22 |
| 4,947,257 | 8/1990 | Fernandez et al. | 358/22 |

OTHER PUBLICATIONS

Pages from Technical Guide for ATVista Videographics Adapters, issued by Truevision, Inc., Jan. 1988.

*Primary Examiner*—Ulysses Weldon
*Assistant Examiner*—Matthew Luu
*Attorney, Agent, or Firm*—Robert S. Babayi; Stephen A. Terrile

[57] ABSTRACT

A multimedia solution is presented which allows a multimedia architecture to be implemented on an existing computer system. According to the invention, an expansion unit which incorporates a multimedia architecture is provided. The expansion unit is connected to an existing computer system via an expansion slot of an I/O bus of the existing computer as well as via a display device output terminal of the computer. The expansion unit is also connected to a display device. Accordingly, the expansion unit controls the presentation which is provided on the display device.

12 Claims, 6 Drawing Sheets

MULTIMEDIA EXPANSION UNIT

CROSS-REFERENCE TO RELATED APPLICATIONS

This is a continuation of prior continuation application Ser. No. 08/000,521 filed Jan. 4, 1993, now abandoned which is a continuation of abandoned parent application Ser. No. 07/650,395 filed Feb. 4, 1991.

This application is related to the commonly-assigned application of John M. Dinwiddie, Jr., Bobby J. Freeman, Gustavo A. Suarez and Bruce J. Wilkie titled "Multimedia System", U.S. Ser. No. 07/625,564, filed Dec. 11, 1990, the commonly-assigned application of John M. Dinwiddie, Jr., Bobby J. Freeman, Gustavo A. Suarez and Bruce J. Wilkie titled "Media Control Module of a Multimedia System", U.S. Ser. No. 07/625,712 filed Dec. 11, 1990 and the commonly-assigned application of John M. Dinwiddie, Jr., Bobby J. Freeman, Gustavo A. Suarez and Bruce J. Wilkie titled "Bus Architecture for a Multimedia System", U.S. Ser. No. 07/625,577 filed Dec. 11, 1990 which are hereby incorporated by reference.

BACKGROUND OF THE INVENTION

The present invention relates to multimedia computer systems.

Multimedia computer systems are information handling systems which combine the information handling characteristics of traditional computer systems with high quality video and audio presentations. The video presentation is provided by a video display device, and the audio presentation is provided by an audio output device.

Multimedia computer systems include media sources which generate media signals. The media signals include audio signals, which are provided to the audio output device, and image signals, which are provided to the video display device. The image signals may include graphics signals, text signals, animation signals and full motion video signals. An image signal is converted to a video presentation by the display device, which receives the image signal and scans the image signal in a raster pattern across a screen of the display device. The speed with which the display device scans the image is called the sweep rate. The screen has a horizontal resolution and a vertical resolution which define display device screen coordinates. The presentation from one complete scan of the screen is called a frame. To provide a full motion video presentation, a display device generates multiple frames per second.

For example, the multimedia computer system of the above-referenced patent application provides an architecture which includes an input output (I/O) bus via which input output information is transferred and a media bus via which the media information is transferred. This multimedia system is an architectural approach to providing a multimedia system. Accordingly, implementation of such a multimedia system requires an new computer system.

SUMMARY OF THE INVENTION

It has been discovered that by providing an expansion unit which incorporates a multimedia architecture, the expansion unit being connected to an existing computer system via an expansion slot of an I/O bus of the existing computer as well as via a display device output terminal of the computer, a multimedia solution is presented which allows a multimedia architecture to be implemented on an existing computer system.

DETAILED DESCRIPTION

Figure 1:
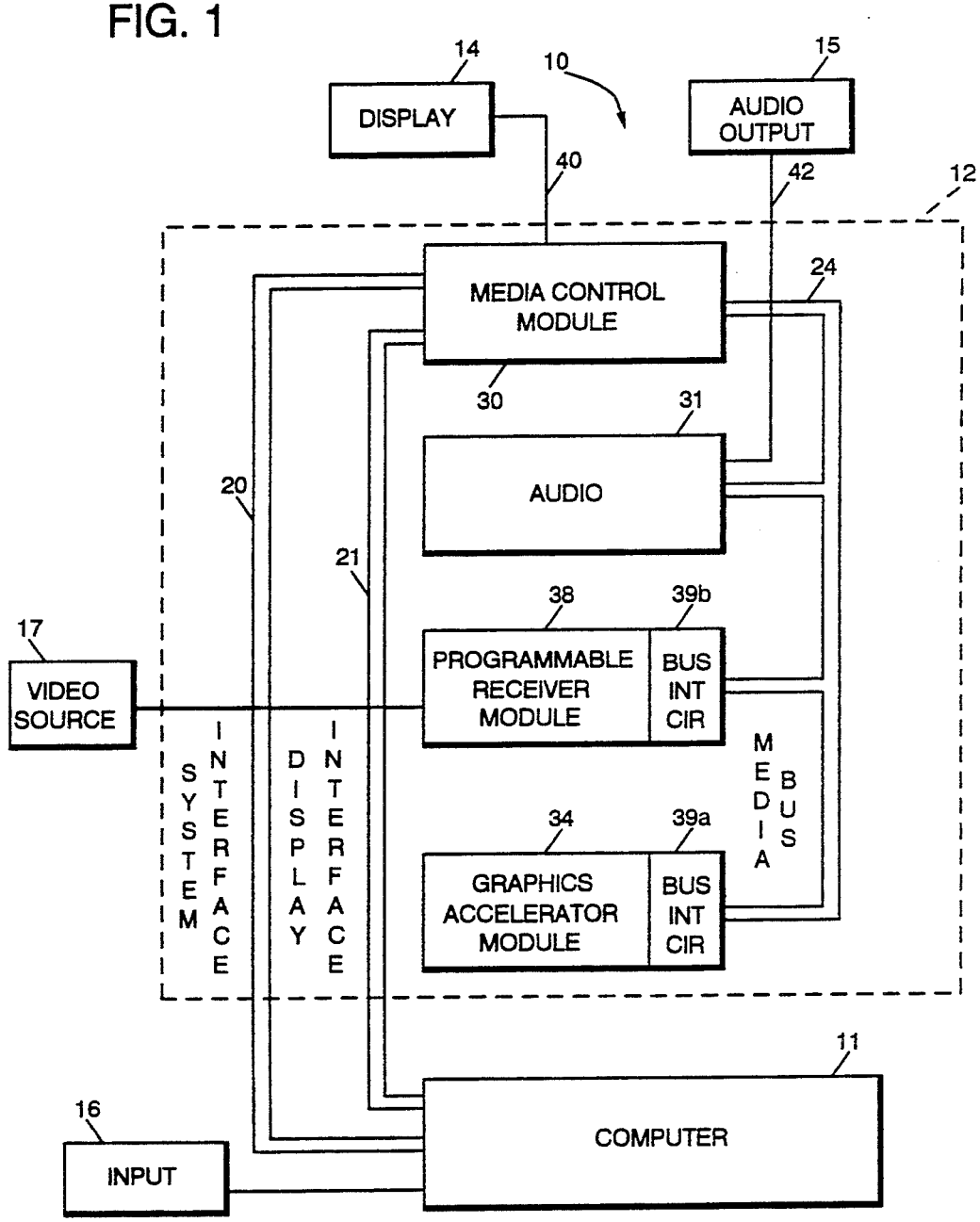
FIG. 1 is a block diagram of a multimedia system according to the present invention.
Figure 4A:
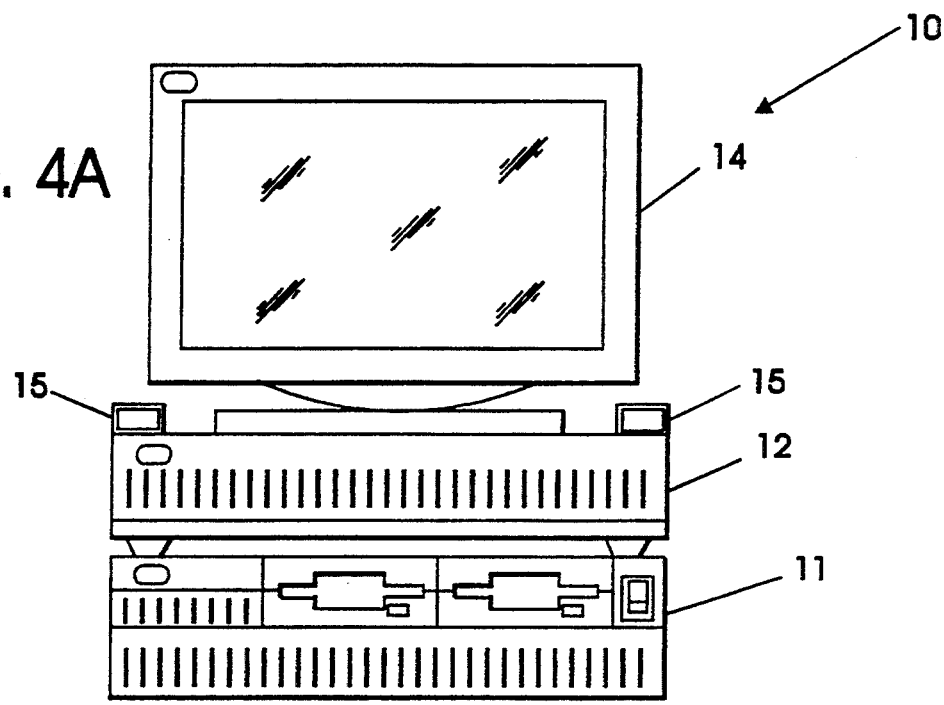
FIGS. 4A and 4B are front and rear views, respectively, of a multimedia system according to the present invention.
Figure 4B:
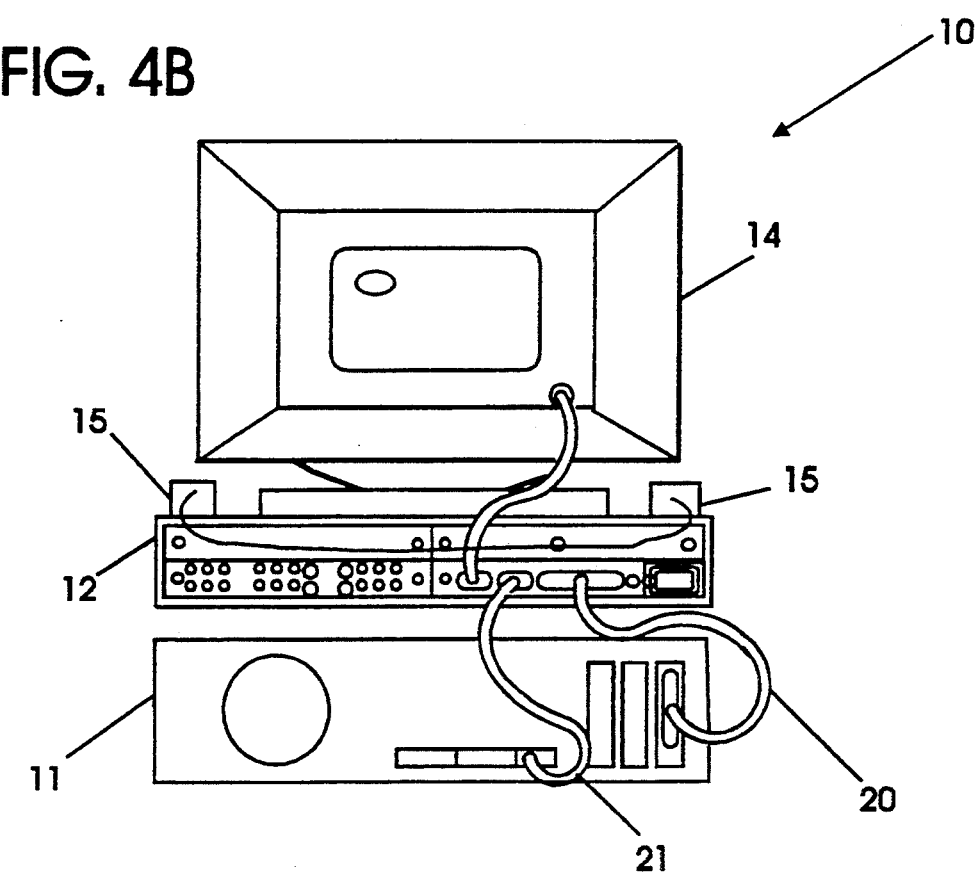

Referring to FIGS. 1, 4A and 4B, multimedia system 10 includes: computer 11, which may be for example, an IBM Personal System/2 personal computer; multimedia expansion unit 12; display device 14, which may be for example an all points addressable (APA) video graphics array (VGA) or high definition television (HDTV) display device; audio output device 15, which may be for example speakers or headphones; input device 16, which may be for example a keyboard or a mouse; and, analog full motion video source 17, which may be for example, a video tape player or a video disk player. Multimedia expansion unit 12 is arranged in modules; information is transferred among modules via media bus 24. Information is provided to and received from multimedia expansion unit 12 via system interface 20 and display interface 21. System interface 20 is inserted into an expansion slot of an I/O bus of computer 11. Display interface 21 is connected to a display device output terminal of computer 11, i.e., to the connector of computer 11 to which a display device is normally connected.

Multimedia expansion unit 12 includes media control module 30 and may include audio module 31, graphics accelerator module 34, and programmable receiver module 38. Modules 34, and 38, which are media sources (i.e., devices which provide media signals), are each connected to media bus 24 via media bus interface circuits 39a, 39b respectively. (Media bus interface circuits 39a, 39b are referred to generally as bus interface circuit 39.) Image signals from the media sources selectively access media bus 24 in response to control information; the selective access allows real time composition of the image signals. Audio signals from the media sources selectively access media bus 24 in response to control information; the selective access allows real time composition of the audio signals.

A composed image signal is provided from media bus 24 to display device 14 via media control module 30; a composed audio signal is provided to audio output device 15 via audio module 31. Programmable receiver 38 receives analog full motion video input information directly from video source 17; programmable receiver 38 may also receive electromagnetic transmissions from remote transmitters (e.g., television transmissions from television studios). The configuration of multimedia system 10 and of multimedia expansion unit 12 is meant to be representative; it is understood that the system and core configurations may be changed to satisfy a user's needs.

Media bus 24 conforms to the media bus architecture which is described herein. Media bus 24 is connected between media control module 30, audio module 31 and media bus interface circuits 39 of media sources such as graphics accelerator module 34 and programmable receiver module 38.

Media expansion unit 12 composes image signals in real time for display by display device 14. In other words, media core 12 combines image signals in parallel in real time on a point by point basis for display by display device 14. For the purposes of this application, "real time" is determined with reference to the sweep rate of display device 14, i.e., the speed with which information is presented by display device 14. Accordingly, the speed with which media bus 24 transmits information need only be as fast as the sweep rate of display device 14.

An image signal which is provided by a media source is provided to media bus 24 via a respective media bus interface circuit 39 on a point by point basis in response to control information; an image signal which is provided by computer 11 is provided via display interface 21 on a point by point basis in response to control information. A point is related to the resolution of display device 14. Accordingly, if display device 14 is a 640 by 480 VGA monitor, a point corresponds to a coordinate of the VGA monitor. Alternately, if display device 14 is a 1920 by 1035 HDTV monitor, a point corresponds to a coordinate of the HDTV monitor.

A virtual screen implementation (i.e., every module, as well as computer system 11, assumes that it is providing an image signal to a display) is used by multimedia system 10 to achieve application transparency. A virtual screen implementation creates the appearance to each module of a dedicated display device. Thus, each media source which is generating an image signal generates that image signal whether or not the media source is granted access to media bus 24.

An image signal which is contained on media bus 24 is received by media control module 30 on a point by point basis and is provided to display device 14 on a point by point basis. The combination of the image signals from the media sources on media bus 24 provides a preliminary composed image signal which is provided to media control module 30. Media control module 30 combines this preliminary composed image signal with any image signal which is provided by computer 11 to provided a composed image signal to display device 14. Media control module 30 adjusts the attributes (e.g., the voltage level) of the composed image signal to correspond to the attributes required by display device 14 and drives an adjusted composed image signal to display device 14.

Figure 2:
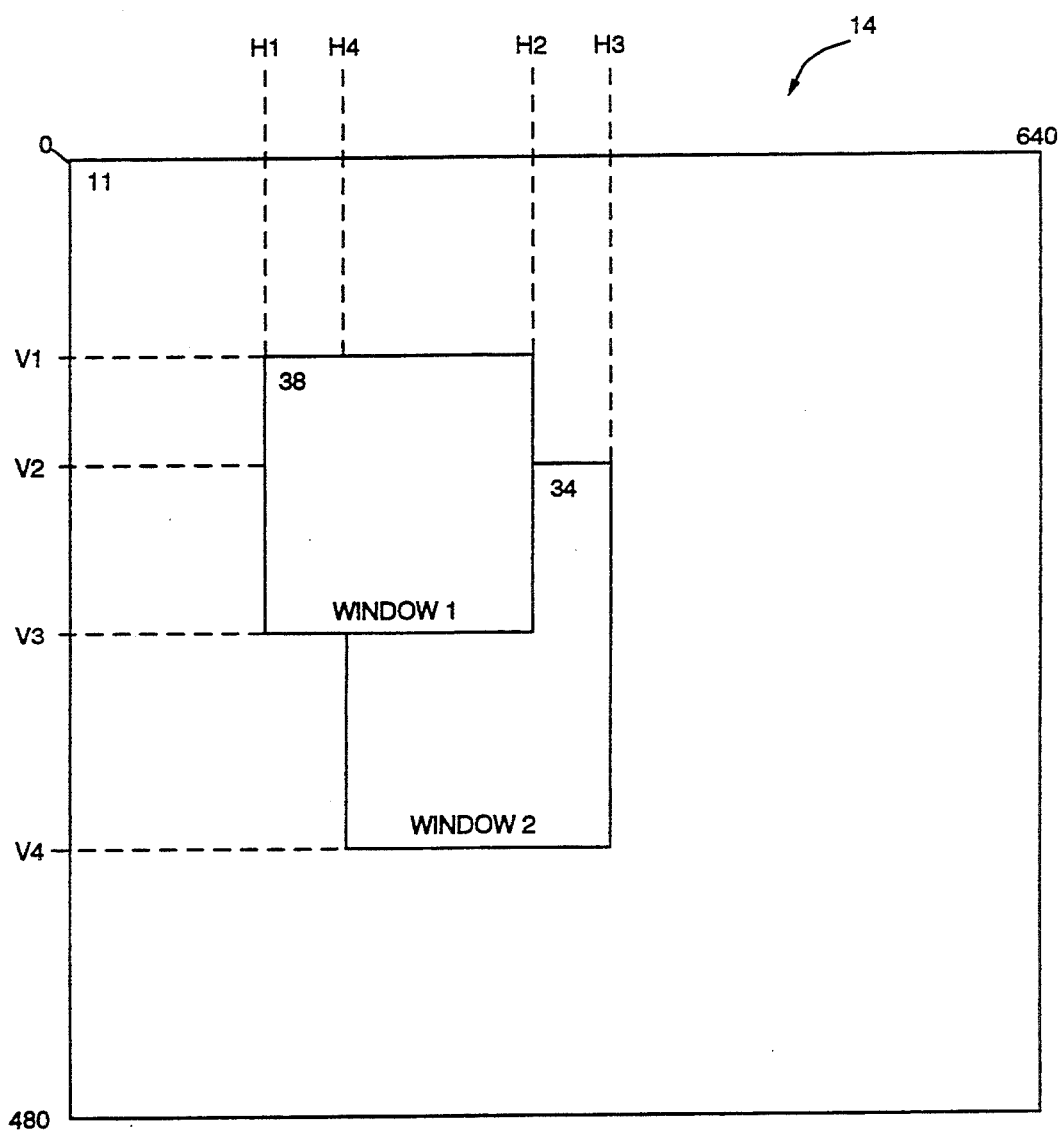
FIG. 2 is an example of a composed frame.

Referring to FIG. 2, an example of a composed frame is shown. For the purposes of this example, display device 14 is a VGA display device having a display resolution of 640 columns by 480 rows. The image signal which provides the background plane is provided by computer 11. An image signal which is displayed in a first window (WINDOW 1) is provided by programmable receiver 38; this image signal is a full motion video signal. An image signal which is displayed in a second window (WINDOW 2) is provided by graphics accelerator module 34. It is understood that the example shown is merely meant to be illustrative of the invention.

The example shown is for one frame of display device 14. This frame is repeated multiple times per second thus allowing display device 14 to provide a full motion presentation. Accordingly, the following description of a composition of a frame is repeated multiple times per second.

During composition of the frame, bus interface circuits 39 allow selective access to media bus 24 of respective media sources in response to control information. In the preferred embodiment, the control information is provided by media control module 30. The control information which is provided to bus interface circuits 39 includes switching coordinate information as well as window priority information. This control information is provided when the frame is initially composed and is maintained within bus interface circuits 39 until the information for a particular module changes. I.e., multiple frames may be composed from the same switching coordinate information. If certain switching coordinate information is modified (e.g., because the display area of a particular module changes) then the modified switching coordinate information is provided to the appropriate bus interface circuit 39. This modified switching coordinate information is substituted within the appropriate bus interface circuit 39.

Synchronized media sources drive media bus 24 in real time. Image signals are received by media control module 30 in real time. Thus for sources which are synchronized, there is no need to store information within video memory before displaying the information via display device 14. Accordingly, the image signals that are contained on media bus 24 provide a preliminary composed image which is a single plane. Unsynchronized media sources provide image signals to media control module 30, which synchronizes these signals prior to display.

Composition of the frame shown in FIG. 2 is initiated by media control module 30 providing the computer image signal to display device 14 based upon the window priority and switching coordinate information for computer 11. Computer 11 provides an image signal to media control module 30. Media control module 30 provides this image signal to display device 14 until display device 14 reaches coordinate H1,V1. At this location, media control module 30 rescinds the access grant of computer 11 and simultaneously, bus interface circuit 39b grants programmable receiver module 38 access to media bus 24. Media control module 30 receives the image signal from media bus 24 and provides this signal to display device 14.

Programmable receiver module 38 provides an image signal to media bus 24 until display device 14 reaches coordinate H2,V1, at which location bus interface circuit 39b rescinds the access grant to media bus 24 of programmable receiver module 38 and media control module 30 grants computer 11 access to display device 14. Access to display device 14 continues to be interchanged between computer 11 and programmable receiver module 38 at the horizontal coordinates H1 and H2 until display device 14 reaches coordinate H2,V2.

At coordinate H2,V2, bus interface circuit 39b rescinds the grant of access to media bus 24 of programmable receiver module 38 and bus interface circuit 39a grants graphics accelerator module 34 access to media bus 24. Graphics accelerator module 34 provides an image signal to media bus 24 until location H3,V3, at which location access to display device 14 is switched to computer 11. Access to display device 14 continues to be exchanged between computer 11, programmable receiver module 38, and graphics accelerator module 34 at the horizontal coordinates H1, H2 and H3 until display device 14 reaches coordinate H4,V3.

At coordinate H4,V3, programmable receiver 38 has completed its contribution to the composition of the screen to display device 14. Accordingly, for the remainder to the screen, programmable receiver 38 is no longer granted access to media bus 24.

At horizontal coordinates H3 and H4, access to display device 14 is switched between computer 11 and graphics accelerator module 34 until display device 14 reaches coordinate H3,V4. At coordinate H3,V4, access to display device 14 is returned to computer 11 for the remainder of the frame.

Referring again to FIG. 1, media bus 24 serves as the pathway for media signals defined by the media bus architecture. The media bus architecture defines media signals for transfer of information between media sources and media control module 30. The media signals include image signals, control signals and audio signals. Accordingly, media bus 24 includes a plurality of video channels, a media control channel (MCC) and an audio channel. The video channels include a primary video channel (PVC), a secondary video channel (SVC), and a digital video channel (DVC).

The primary video channel is the channel via which image signals from the media sources are composed to provide a primary composed image signal to media control module 30. The primary channel includes paths for a primary analog image signal having red green and blue components (PVC RGB), a primary color key match (PVC CKM) signal, and a primary arbitration signal (PVC ARB). The PVC RGB signal is a differential analog RGB signal which is driven directly onto the primary channel by the media sources as an analog waveform under control of media control module 30. The PVC CKM signal controls video switch multiplexing in media control module 30; the PCKM signal is driven active low at pixel rates coincident with RGB dam. The PVC ARB signal is a 4-bit one of sixteen priority arbitration signal.

The secondary video channel is the channel via which alternate or additional image signals from the media sources are composed to provide a secondary composed image signal to media control module 30. The secondary channel includes paths for a secondary analog image signal having red, green and blue components (SVC RGB), a secondary color key match (SVC CKM) signal, and a secondary arbitration signal (SVC ARB). The SVC RGB signal is a differential analog RGB signal which is driven directly onto the secondary channel by the media sources as an analog waveform under control of media control module 30. The SVC CKM signal controls video switch multiplexing in media control module 30; the SVC CKM signal is driven active low at pixel rates coincident with RGB dam. The SVC ARB signal is a 4-bit one of sixteen priority arbitration signal.

The digital video channel is the channel via which digital video signals are transferred from a media source to media control module 30. The digital video channel is capable of supporting high-speed live video transfers as required by HDTV and other high resolution displays as well as transfers from other digital video sources. The digital video channel includes paths for a 32-bit image signal (DIG IM), a digital clock signal, a digital HSync signal and a digital VSync signal. The DIG IM signal includes an active high 8, 16, or 24-bit RGB signal, plus an 8-bit Alpha signal, which represents a degree of transparency. The digital clock signal is provided by media control module 30 to clock data either through media control module 30 to the media control module RGB output terminals or into a frame buffer of media control module 30. The maximum clock frequency of the digital video channel is 80 MHz, thus supporting HDTV data rates of 74.25 MHz.

The media control channel provides paths for media control information which controls the transfer of information over media bus 24. The media control channel allows media control module 30 to issue device-specific control information as well as to broadcast global control information to all media sources. The media control information includes window control block data which are written to each adapter as well as vital product data and personality data which are read from each adapter when system 10 is initialized. The media control channel also includes paths for a source synchronization signal (SOURCE SYNC) and a system synchronization signal (SYS SYNC) as well as a master clock signal (MASTER CLK). The media control channel also includes a path for a global reference signal (V BIAS) which is provided to all media sources which are connected to media bus 24.

The audio channel includes paths for a high fidelity digital audio signal (AUDIO) as well as a telephony grade digital (TEL AUDIO).

Figure 3A:
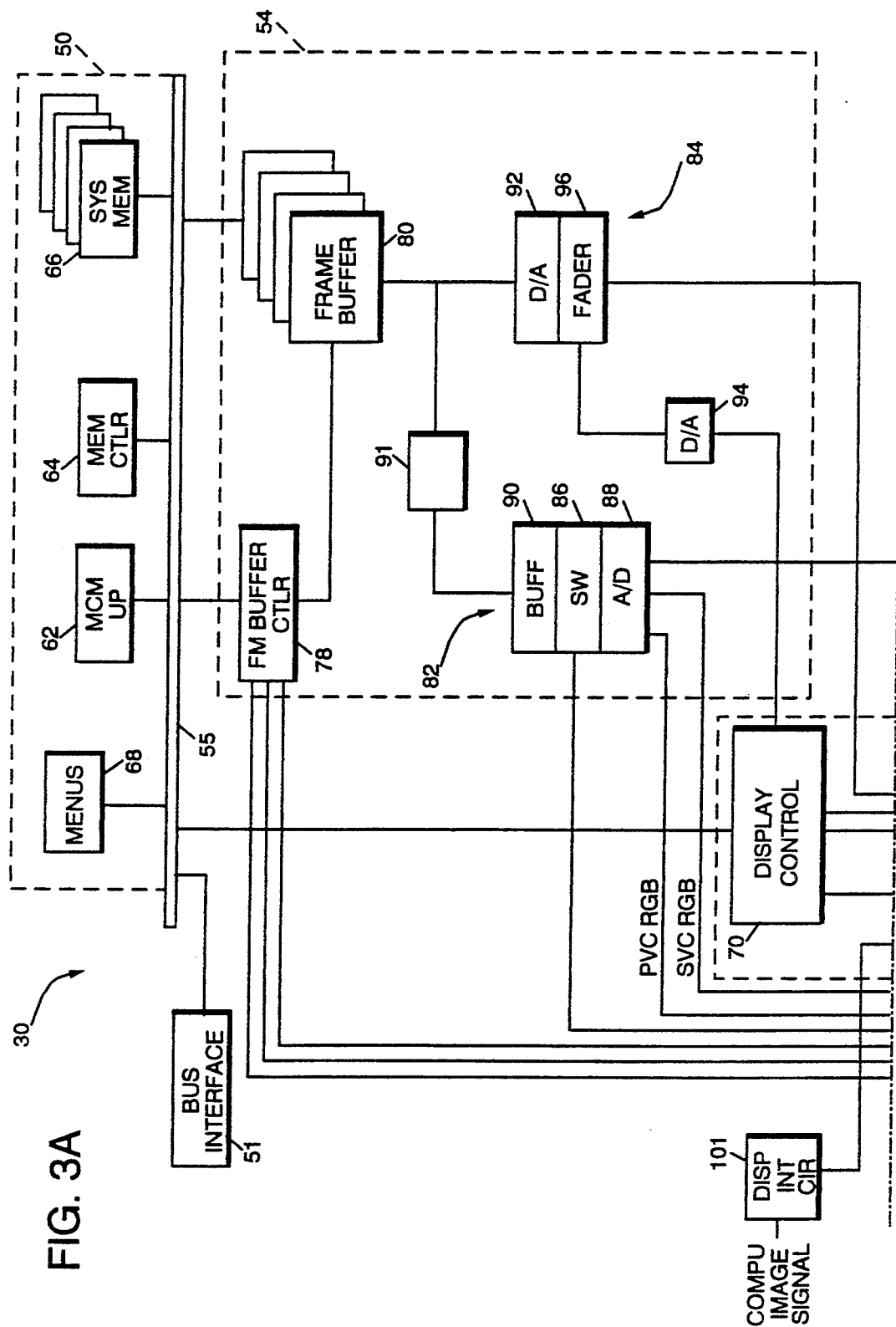
FIG. 3 is a block diagram of a media control module and an audio module of the FIG. 1 multimedia system.
Figures 3, 3B:
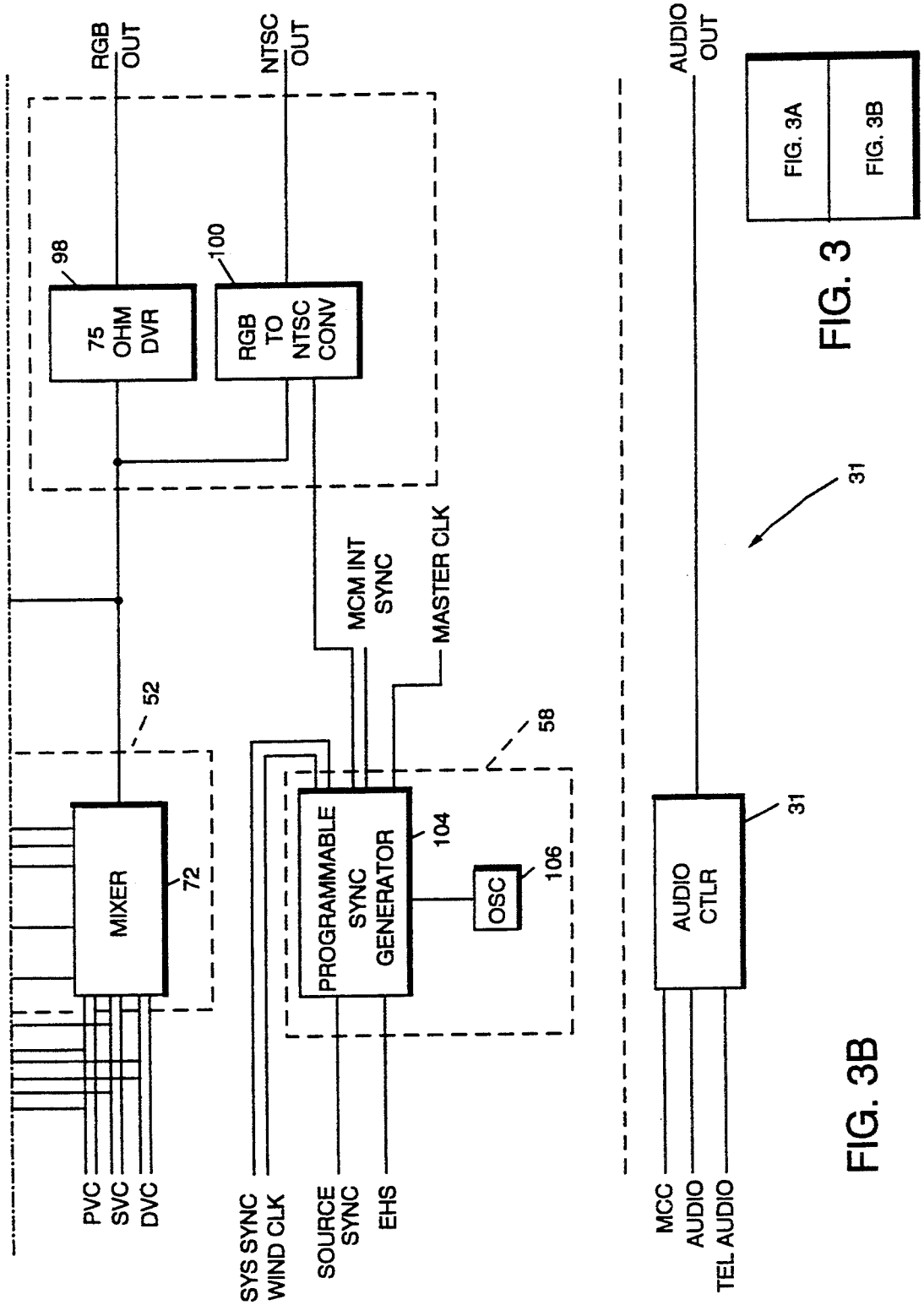

Referring to FIGS. 1 and 3, media control module 30 provides a plurality of functions for media core 12. Media control module 30 controls composition on media bus 24. Media control module 30 also functions as a receiver and level converter for an image signal which is received from the primary video channel, the secondary video channel or the digital video channel. Media control module 30 also functions as a composition facility for image signals which are provided by computer 11. Media control module 30 also functions as a video mixer for mixing image signals from the primary video channel, the secondary video channel and the digital video channel as well as image signals which are generated internally by media control module 30. Media control module 30 also functions as an image capture facility for storing images from a media source. Media control circuit 30 also functions as a display device driver circuit as well as a computer display interface. Media control module 30 also functions as a synchronization signal generator for generating the synchronization signals for media core 12. Media control module 30 also functions as a composition facility for audio signals. Media control module 30 also interfaces with the system bus of computer 11. Some of the functions which media control module 30 performs occur continuously, other functions occur as needed. However, a plurality of functions can occur simultaneously.

Media control module 30 receives continuous data streams across the video channels of media bus 24 while controlling the media sources via the media control channel. Media control module 30 includes media control circuit 50, bus interface circuit 51, image signal processor circuit 52, and frame capture circuit 54, all of which are connected via media control module bus 55. Media control module 30 also includes display device adapter circuit 56, synchronization generator circuit 58.

When controlling composition of image signals on media bus 24, media control module 30 uses media control circuit 50. Media control circuit 50 includes media control module microprocessor 62, memory controller 64, media system memory 66, which is dynamic random access memory (DRAM), and menu memory 68, which is an electronically erasable programmable read only memory. Media system memory 66 holds a media control module operating system which controls the functions of media control module 30; memory 66 also contains I/O handling information for interfacing with input device 16. Menu memory 68 stores menu information which may be accessed via input device 16 (e.g., pull-down menus which are accessed via a pointing device such as a mouse). Media control module microprocessor 62 accesses media system memory 66 and menu memory 68 via memory controller (:st. Memory controller 64 also controls access to any memory which may be resident on a particular bus interface circuit 39. E.g., if a new module is added to media core 12, media control module 30 requires media source personality data which are stored in the bus interface circuit 39 of the new module. The media source personality data are passed in a personality block via the media control channel 30 under control of memory controller 64. The personality data are used by media control module microprocessor 62.

Composition of a frame is initiated by a user defining composition characteristics via input device 16. The composition characteristics may include the desired size and shape of a window via which the image signal for a particular media source is to be displayed. Media control module microprocessor 62, in conjunction with the I/O handling information which is stored in media system memory 66, receives the user defined composition characteristics. Media control module microprocessor 62 then generates control information such as switching coordinate information and window priority information which is transmitted via the media control channel of media bus 24 to the media sources which are connected to media bus 24. The media sources are granted selective access to media bus 24 based upon this control information.

When functioning as a receiver and level converter or when functioning as a video mixer, media control module 30 uses image signal processor circuit 52. Image signal processor circuit 52 includes display controller 70 as well as mixer circuit 72. Display controller 70 functions as an interface circuit between frame capture circuit 54 and mixer circuit 72 because, by using frame capture circuit 54, media control module 30 may function as a source of an image signal. In addition to functioning as an interface between frame capture circuit 54 and mixer 72, display controller 70 also manages acquisition and display of images which are stored in frame capture circuit 52. Display controller 70 also manages other display functions such as background color flood in which the background presentation of display device 14 is set to a certain color. Display controller 70 also controls the fade level of selected frame buffer images (e.g., the menu image or a captured image) under control of media control module microprocessor 62.

When functioning only as a receiver and level converter, mixer circuit 72 of image signal processor circuit 52 receives either the PVC RGB signal, the SVC RGB signal or the DIG IM signal from media bus 24. Mixer circuit 72 levels the received image signal to provide a composed image signal (COMP RGB) which has a constant base output level, e.g., a constant black level.

When functioning as a leveling circuit and a mixer circuit, mixer circuit 72 of image signal processor circuit 52 receives one or more of the PVC RGB and PVC CKM signals, the SVC RGB and SVC CKM signals, and the DIG IM signal from media bus 24, as well as a capture signal (MCM RGB) from frame capture circuit 54 and the computer image signal from computer 11. Mixer circuit 72 mixes these signals under control of display controller 70 and levels the mixed signal to provide the COMP RGB signal.

When functioning as a composition facility, media control module 30 uses image signal processor circuit 52 in conjunction with media control circuit 50. During composition within media control module 30, mixer circuit 72 switches on a point by point basis between the PVC RGB, SVC RGB and DIG IM signals as well as a frame capture signal which is provided by frame capture circuit 54 and the computer image signal which is provided by computer 11 to provide the COMP RGB signal. Display controller 70 controls the switching based upon information which is provided by media control circuit 50. Media control circuit 50 provides this information in response to user defined composition characteristics.

When functioning as an image capture facility, media control module 30 uses frame capture circuit 54. Frame capture circuit 54 includes frame buffer control circuit 78, frame buffer 80, which is video random access memory (VRAM), switch circuit 82 and fader circuit 84. Switch circuit 82 includes image switch 86, analog to digital (A/D) converter 88 and buffer circuit 90. Fader circuit 84 includes digital to analog converters 92, 94 and fader circuit 96. Frame capture circuit 54 receives the synchronization signals PVC SYNC, the SVC SYNC, the SYS SYNC. Frame capture circuit 54 also receives the PVC RGB signal, the SVC RGB signal and the DIG IM signal from media bus 24 and a composed image signal from image signal processor circuit 52 and selectively stores one of these signals in response to control information which is provided by media control module microprocessor 62 via media control bus 55 to capture a frame of information. When storing the frame capture signal, frame capture circuit is synchronized by the synchronization signal. Frame capture circuit 54 may provide to image signal processor circuit 52 the analog equivalent of the capture signal as the MCM RGB.

Frame capture circuit 54 is used to capture images, to receive image signals from non-genlocked (i.e., unsynchronized) sources and to provide menu information. Accordingly, frame buffer 80 includes both an image capture plane as well as a menu plane. The image capture plane is capable of storing four captured images. The menu capture plane is capable of storing menu information which is received from menu memory 68.

When capturing an image, image signals are selectively provided to frame buffer 80 via switch 86. The analog image signal is converted to an equivalent digital signal via analog to digital converter 88 prior to being provided to switch 86; the switched image is buffered via buffer 90. Buffer 90 is used to synchronize information which is provided to frame buffer 80 because the information may not be genlocked (i.e., synchronized) or may have timing skews due to composition or bus transmission. Image signals are provided to frame buffer 80 via serial ports. Information which is synchronized by buffer 90 may be scaled by scaler 91 prior to being stored in frame buffer 80. When writing to frame buffer 80, frame buffer 80 is synchronized with the source of the information. When reading from frame buffer 80, frame buffer 80 is synchronized with the SYS SYNC signal.

When presenting menu information, menu information which is stored in menu memory 68 is provided, via media control module bus 55, to a random access port of frame buffer 80 by media control module microprocessor 62. The menu information is stored in the menu plane of frame buffer 80. The menu information which is stored in the menu plane is then presented via mixer circuit 72.

When functioning as a display device driver, media control module 30 uses display device adapter circuit 56. Display device adapter circuit 56 includes 75 ohm driver circuit 98 and RGB to NTSC converter circuit 100. Display device adapter circuit 56 receives the composed image signal COMP RGB from image signal processor circuit 52 and the SYS SYNC signal from synchronization generator circuit 58. Display device adapter circuit 56 generates via 75 ohm driver circuit 98 an RGB signal (RGB OUT), which is capable of driving a VGA monitor Display device adapter circuit 56 generates via RGB to NTSC converter circuit 102 a composite NTSC signal (NTSC OUT), which is capable of driving a video monitor, video cassette recorder or other device which requires a direct composite baseband video input signal. When functioning as a display device adapter circuit, media control module 30 also uses computer display adapter circuit 101, which receives image signals from computer 11 and, if necessary converts these signals to correspond to the format of display device 14. For example, if computer 11 provided image signal as signals with correspond to the enhanced graphics adapter (EGA) format and display device 14 was compatible with the video graphics array format, then display adapter circuit 101 converts the EGA format signals to correspond to VGA format signals.

When functioning as a synchronization signal generator, media control module 30 uses synchronization generator circuit 58. Synchronization generator circuit 58 includes programmable sync generator 104 and oscillator 106. Synchronization generator circuit 58 receives the SOURCE SYNC signal, which is received via media bus 24 from a media source as selected by media control module microprocessor 62, an external house synchronization signal (EHS), which may be externally provided to media control module 30, and an internal synchronization signal (INT SYNC) which is generated by oscillator 106 of synchronization generator circuit 58. The EHS signal may be a sychronization signal which includes separate horizontal and vertical components (EHS HSYNC, EHS VSYNC), a composite synchronization signal (i.e., a single signal which includes both horizontal and vertical components) or a black burst synchronization signal (i.e., a composite signal minus any video). Synchronization generator circuit 58 provides the SYS SYNC signal and the WIND CLK signal to the media control channel as well as a master clock signal (MASTER), which is the clock signal used internally by media control module 30, a blanking signal (BLANKING), a media control module synchronization signal (MCM SYNC), a display synchronization signal (DISP SYNC) and an NTSC composite synchronization signal (NTSC SYNC). The WIND CLK signal is provided to all media sources, thus allowing synchronous switching during composition. The MASTER signal is the clock signal used internally by media control module 30. The BLANKING signal, which includes a horizontal blanking signal (H BLANKING) and a vertical blanking signal (V BLANKING), controls when display device 14 is not illuminated such as during the retrace of a display device which scans an image signal. The MCM SYNC signal, which includes a horizontal component (MCM HSYNC) and a vertical component (MCM VSYNC), controls the display timing for media control module 30. The NTSC SYNC signal is the signal which is a synchronization signal which is compatible with the standard U.S. NTSC format. The DISP SYNC signal, which includes a horizontal component (DISP HSYNC) and a vertical component (DISP VSYNC), controls the horizontal and vertical synchronization pulses which VGA type display devices require.

When interfacing with system bus 20, media control channel 30 uses bus interface circuit 51. Bus interface circuit 51 also allows computer 11 to interface with the media control channel of media bus 24. Bus interface circuit 51 functions as a terminator for signals which are transported over the I/O bus of computer 11 as well as a driver which drives the necessary signals to media control module bus 55.

Figure 5:
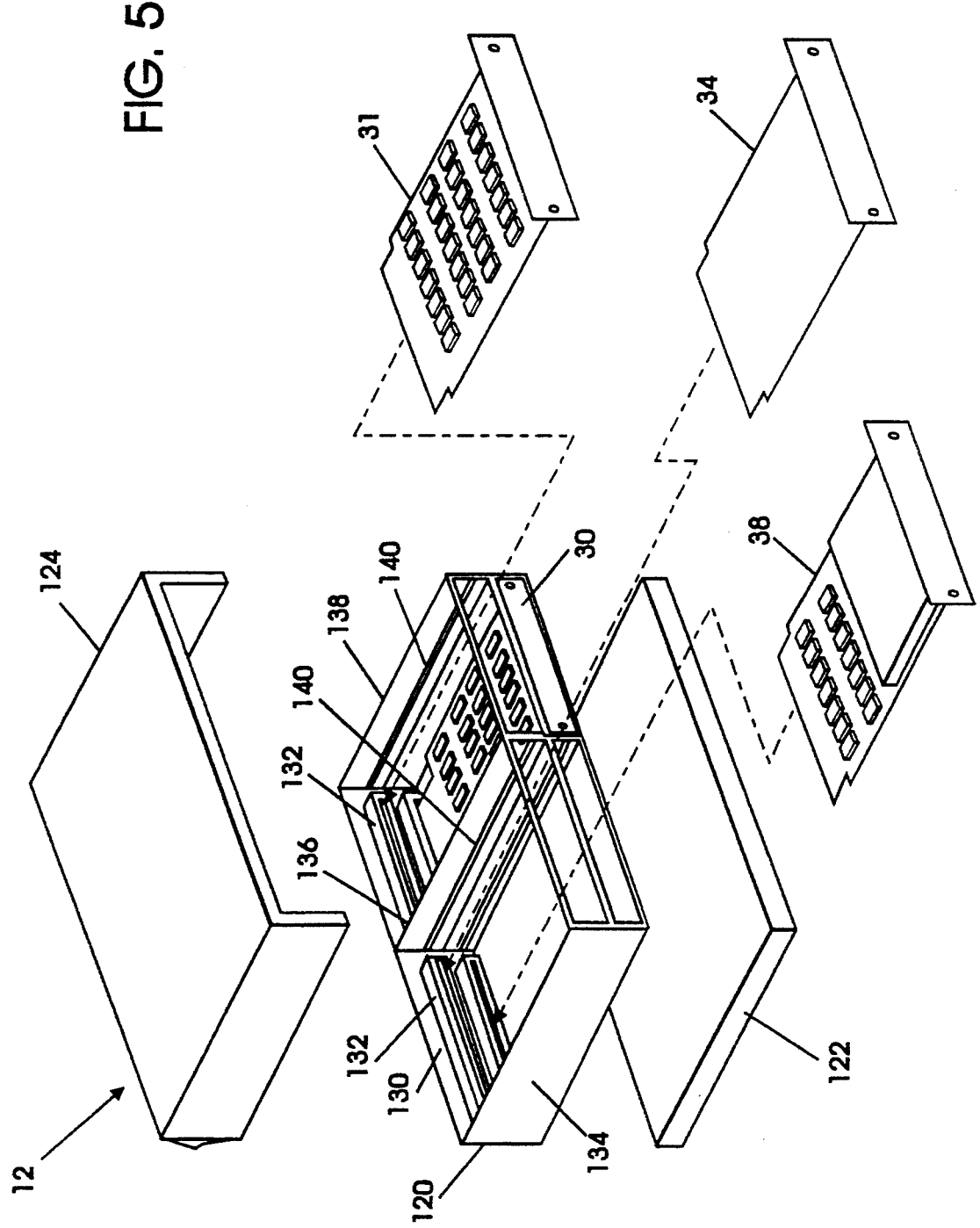
FIG. 5 is an exploded view of the multimedia expansion unit of the FIG. 1 multimedia system.

Referring to FIG. 5, multimedia expansion unit 12 includes housing 120, power subsystem 122 and cover 124. Housing 120 includes media bus 24, which is located on backplane 130, as well as connectors 132, which are electrically connected to media bus 24. Connectors 132 are oriented so that modules 30, 31, 34, 38 may be horizontally inserted and thus connected to media bus 24. Housing 120 also includes support walls 134, 136, 138 on which are attached guides 140. Guides 140 guide modules 30, 31, 34, 38 to connectors 132 as the modules are inserted, and support the modules in housing 120 once the modules are inserted. By providing expansion slots, modules may be inserted into multimedia expansion unit 12 at the discretion of the user, the only required module being media control module 30. Accordingly, in the preferred embodiment there are three slots remaining that may be used for multimedia expansion cards such as programmable receiver 38 or graphics accelerator module 34.

Bus interface circuit 51 of media control module 30 is a separate card 51' which is connected to the remainder of media control module 30 via system interface cable 130. The architecture of card 51' corresponds to the I/O bus architecture of computer 11. For example, the architecture of card 51' corresponds to the IBM Microchannel architecture if computer 11 is an IBM Personal System/2 personal computer. Alternatively, if computer 11 is an IBM AT personal computer, then the architecture of card 51' corresponds to the AT architecture. Power subsystem 122 provides the power required to run any modules which are inserted into multimedia expansion unit 12.

By providing a separate multimedia expansion unit, a conventional computer system can be easily upgraded to function as a multimedia system. Additionally, because multimedia expansion unit 11 is separate from computer 11, electromagnetic radiation can be contained within expansion unit 12 so as to not interfere with the operation of the computer. Also, because power base 122 is distributed across the bottom of housing 120 and is only powering multimedia expansion unit 12, thus requiting a relatively small power supply, there is no need for any additional cooling fans as heat generated by the relatively small power supply may be passively dissipated. Because system interface circuit 51 may be changed to suit individual. computer systems, multimedia expansion unit 12 may be used with computer systems having different I/O architectures merely by changing the architecture of system interface circuit 51.

Other Embodiments

Other embodiments are within the following claims.

For example, the control information which controls the switching of bus interface circuits 39 may be provided by computer 11 rather than media control module 30.

What is claimed is:

1. An information handling apparatus for constructing composite display images from plural signals representing full motion video and still images comprising:
   a computer having separate I/O and display interfaces, said I/O interface having at least one expansion connection slot for removably receiving at least one I/O device as an optional attachment to said computer, and said display interface being adapted to connect to a raster-scanned video display device having a predetermined viewing area for presenting display images to users of said computer; and
   an expansion unit pluggably attached to a said expansion connection slot of said computer, as an optional extension of a system formed by said computer, said expansion unit also being connected to said display interface of said computer; said expansion unit connecting between said display interface of said computer and a said raster-scanned video display device for directly controlling formation on said display device of said composite images, said composite images having full motion video image components of a type commonly displayed by television receiver sets, and static image components of a type commonly displayed on computer display monitors; said expansion unit operating in direct synchronism with said video display device and having a media interface isolated electrically from said display and I/O interfaces of said computer; said media interface being adapted to connect to plural sources of video image signals external to said computer, including sources of video signals representing full motion television type images; said expansion unit comprising:
      means for controlling said sources of video image signals connected to said media interface to cause said sources to present respective image signals in real time synchronism with raster-scanning functions of said video display device, so as to form a preliminary composite image signal at said media interface composed of signals presented by said sources in time oveday; and
      means responsive to image signals received at said computer display interface and preliminary composite image signals received concurrently at said media interface for forming a final composite image signal representing a composite image to be directly displayed on said video display device; said preliminary composite image signal including live motion and static image components required to occupy separate predetermined portions of said viewing area of said display device.

2. Apparatus according to claim 1 wherein said expansion unit is controlled by said computer, via said I/O interface of said computer, as an I/O device extension of said computer.

3. Apparatus according to claim 1 wherein said means for controlling said sources of video image signals connected to said media interface is adapted to control individual said sources to scale respective image signals furnished by said sources relative to a predetermined display time frame associated with tracing of said viewing area on said display device; whereby signals presented by said sources at said media interface, for incorporation into said composite image as component images, correspond directly in real time to,pixel elements of said composite image.

4. Apparatus according to claim 1 wherein said signals representing said full motion television type images are presented at said media interface in a form allowing for direct integration of respective said full motion images into said composite images without requiring intermediate buffering and modification of the respective signals in transit between said media interface of said expansion unit and said display device.

5. An expansion unit for removable connection to an input-output expansion slot of a computer and for connection between the respective computer and a raster-scanned display device said expansion unit comprising:
   a media interface for connection to at least one source of display image signals external to said computer; said signals susceptible of including signals representing full motion images of the type commonly displayed on television receivers;
   means for controlling said at least one source of display image signals to generate respective image signals in realtime synchronism with display raster-scan frames of said display device; said media interface being isolated from both said computer and said display device; and
   means responsive to display image signals received from said computer and said at least one external source for producing composite image signals directly displayable on said display device; wherein the image signals received from said at least one source of image signals are presented at said media interface in a form allowing for direct integration of display images represented by the respective signals into composite images represented by respective said composite image signals without requiring intermediate buffering or other processing in transit between said media interface of said expansion unit and said display device.

6. An expansion unit according to claim 5 wherein:
   said media interface comprises a multichannel media bus architected for multimedia applications;
   said means for controlling said at least one source of image signals and said means for producing said composite image signals constitute a media control module having connections to said media bus said computer and said display device; and
   said media bus contains at least a control signal channel, for transferring control signals from said means for controlling to said at least one source of image signals, and a video signal channel for transferring video image signals from said at least one source to said means for producing said composite image signals.

7. An expansion unit according to claim 6 wherein:
   said image signals received by said means for producing said composite image signals are signals defining attributes of individual pixel points in a predetermined display frame generated by said display device; and at least some of said image signals transferred to said media bus, by said at least one source of image signals, are scaled at the respective source to coincide directly in real time with the raster scanning of pre-selected points in said display frame, so that said at least some of said image signals can be translated into said composite signals directly, without buffering in said expansion unit.

8. An expansion unit according to claim 7 wherein:
said video signal channel on said media bus includes discrete digital and analog signal sub-channels for respectively transferring digital and analog video image signals from said at least one source.

9. An expansion unit according to claim 8 wherein:
said analog image signals include signals defining red, green and blue color characteristics of individual display pixels.

10. An expansion unit according to claim 8 wherein: said analog image signals include signals defining color key match functions for a color display.

11. An expansion unit according to claim 6 comprising a housing enclosure separate from said computer and display device, and wherein:
said media control module, said media bus and at least one of said at least one sources of image signals are contained within said housing enclosure.

12. An expansion unit according to claim 7 wherein:
individual sources of image signals, constituting said at least one source of image signals, contain respective bus interface circuits connecting between respective sources and said media bus; each said bus interface circuit using control signals received from said expansion unit through said control signal channel of said media bus to condition the respective source to position video image signals defining discrete points of an image at various selected time positions corresponding to selected coordinates in a said display frame.

* * * * *